April 2, 1963 K. HINRICHS ETAL 3,084,321
METHOD OF AND APPARATUS FOR TRANSFERRING
ANALOG SIGNAL VOLTAGES
Filed Sept. 29, 1958
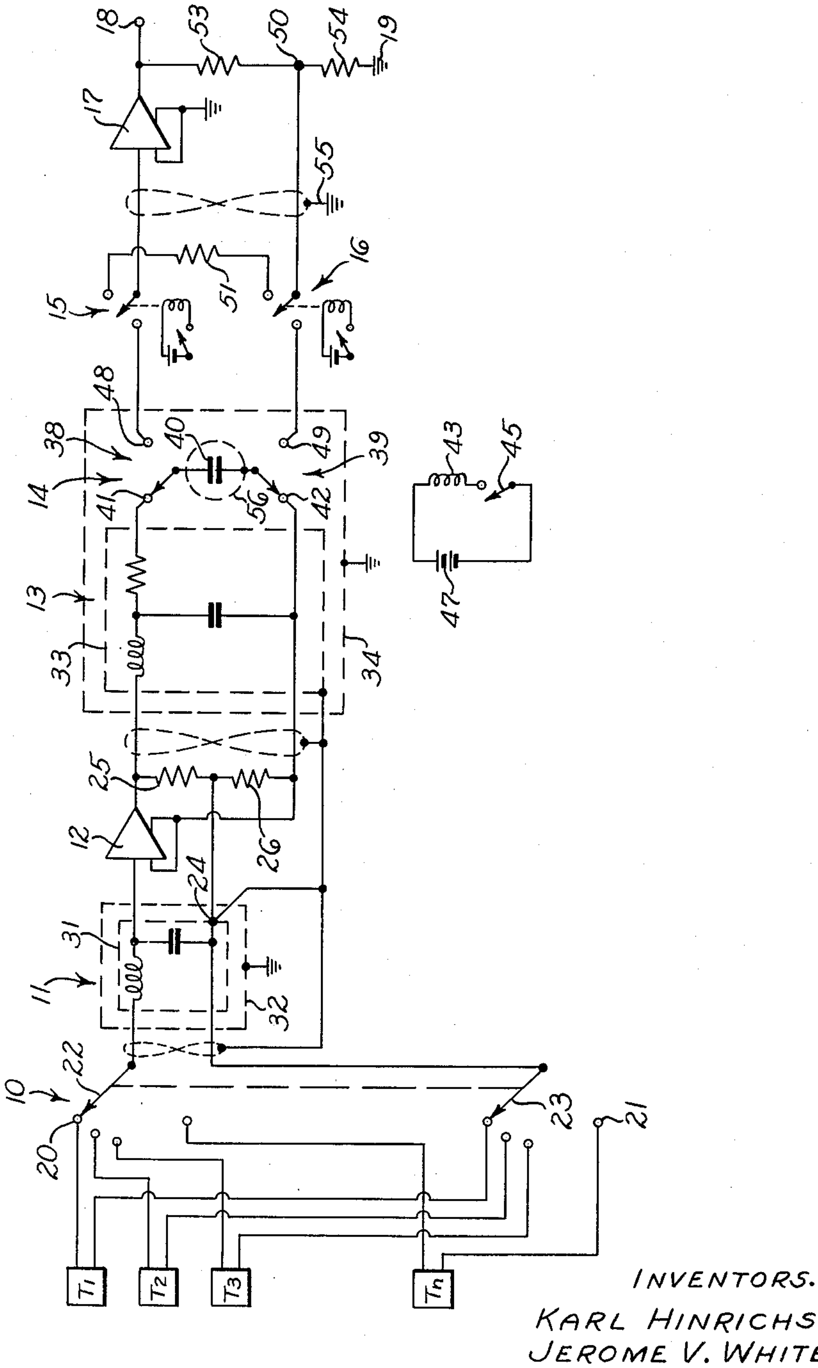
INVENTORS.
KARL HINRICHS
JEROME V. WHITE
BY THEIR ATTORNEYS.
HARRIS, KIECH, FOSTER & HARRIS 3,084,321
Patented Apr. 2, 1963

3,084,321

METHOD OF AND APPARATUS FOR TRANSFERRING ANALOG SIGNAL VOLTAGES

Karl Hinrichs, Anaheim, and Jerome V. White, Whittier, Calif., assignors to Beckman Instruments, Inc., a corporation of California Filed Sept. 29, 1958, Ser. No. 763,864
9 Claims. (Cl. 320—1)

The invention relates to a method of and apparatus for the transfer of an input signal voltage from a device that is floating to a device which is grounded to a so-called common circuit ground.

It is well known that ground potential may differ considerably from location to location, especially where these locations are far apart. Data handling systems that handle a number of analog inputs are an example of a type of apparatus where differences in ground potential play an important role. Very often, a data handling device has to operate on and provide an output based on electrical signals generated in response to physical quantities by transducers which are operated at remote locations in a plant. It is not possible to connect such transducers to the data handling equipment through ground loops because a variable and unknown voltage would be superimposed on the signal voltage of the transducer. Consequently, transducers are generally connected to the input side of the equipment by two shielded wires which are twisted to reduce the influence of electrostatic and electromagnetic fields.

The transducer leads are referenced to the ground potential that exists at the location of the transducer. Since this may be substantially different from ground potential of the measuring equipment, both leads may carry voltages of considerable magnitude with respect to the equipment. Such voltages are common to both leads in the same polarity sense and are characterized by the term "common mode voltage." The common mode voltage differs from the signal voltage in that the signal voltage appears as a difference between the two leads. The common mode voltage will, in many applications, be several orders of magnitude greater than the signal voltage and imposes stringent requirements on the circuit used for the transfer of the signal voltage to a grounded system.

A voltage may be transferred from a signal generating device to a signal responsive device by first connecting the floating input lines of the signal generating device to the terminals of a large capacitor. Then the capacitor is disconnected from the signal generating device and connected to the input terminals of the signal responsive device. Such a circuit can be used where a plurality of transducers or signal generating devices is connected in turn to a single signal responsive device or data handling device or the like. In such a circuit, the responsive device works only for a very short time on the signal in question. When the capacitor is connected to the generating device, it remains in that position long enough to be charged to the full voltage generated by the transducer. Thereafter, when it is connected for a short time to the responsive device, the capacitor is unloaded only to a negligible extent because of the relatively high input impedance of the responsive device. A true transfer of voltage would be possible if the capacitor were perfectly isolated capacitatively and conductively from the rest of this system, as the voltage on the capacitor would truly represent the voltage generated by the transducer.

However, such hypothetical perfect isolation has not yet been achieved, one source of error being the intercapacitance between the capacitor and the common circuit ground. The present invention deals primarily with circuitry for eliminating harmful effects of the intercapacitance between the capacitor and incoming signal leads and the grounded part of the system. Accordingly, it is an object of the invention to provide a signal voltage transfer circuit which allows an accurate transfer of a floating input voltage to a grounded system. A further object of the invention is to provide such a transfer circuit which can be applied to a plurality of floating input voltages in sequence such that only one transfer circuit is necessary for a plurality of input generating devices.

It is an object of the invention to provide a signal voltage transfer circuit wherein the transfer capacitor is enclosed in a shield which is connected to one terminal of the capacitor. A further object of the invention is to provide such a circuit wherein the shielded capacitor and the transfer switching equipment are enclosed in a second shield which is connected to a common circuit ground. Another object of the invention is to provide such a circuit wherein one of the input leads has a lower impedance to ground than the other and in which the capacitor shield is connected to the capacitor terminal which contacts said one lead.

It is an object of the invention to provide a signal voltage transfer circuit in which a filter section may be inserted ahead of the switching equipment. A further object is to provide such a circuit wherein the capacitor is enclosed in a shield connected to one capacitor terminal, the filter section is enclosed in another shield connected to one of the incoming signal leads and the shielded capacitor, shielded filter section and the switching equipment are enclosed in a third shield connected to a common circuit ground.

In general, the signal voltage transfer circuit of the invention contemplates a voltage transfer capacitor having an electrostatic shield which is at the potential of one of the input leads and further contemplates a capacitor switching relay or the like having an electrostatic shield that is at the potential of a common circuit ground.

In many applications of such signal voltage transfer circuits, the switches or relays employed must perform satisfactorily for a large number of switching cycles, placing severe endurance requirements on the stationary and moving contacts. In one apparatus now in use, the transfer relays must operate in the order of five times per second, night and day, without interruption for many years. Under such circumstances, relays utilizing pools of mercury as the moving contacts are ordinarily used, as the life expectancy is much higher than with solid metallic contacts.

The desired isolation between signal generating device or signal source and signal responsive or output device is not achieved when mercury type switching equipment is used since the mercury tends to form a common pool between input and output contacts causing the switch to operate in the nature of a make-before-break type providing conduction between the signal source and the output device. It is an object of the invention to provide a method of and apparatus for analog switching of signals from floating inputs to grounded outputs with which mercury type relays may be used while the desired capacitive and conductive isolation is maintained. A further object of the invention is to provide such switching circuitry whose operating life is not dependent upon metallic contact wear.

It is an object of the invention to provide a method of transferring a signal voltage from a floating source to a grounded output device wherein a floating capacitor is charged with the signal voltage from the source and then connected across a pair of intermediate terminals after which the intermediate terminals are connected to the output device. A further object is to provide such a method where one lead of the source and one lead of the output device have a lower impedance to ground than the other lead of each pair, with the intermediate terminal which is being connected to the capacitor plate previously connected to the low impedance source lead subsequently connected to the low impedance output lead. A further object is to provide such a method wherein the intermediate terminals are disconnected from the output device and the capacitor is disconnected from the intermediate terminals and reconnected to the source in the opposite sequence to the connection thereof.

The invention also comprises details of construction and novel combinations and arrangements of parts which will more fully appear in the course of the following description. The drawing merely shows and the description merely describes a preferred embodiment of the present invention which is given by way of illustration or example.

The circuit of the drawing includes a plurality of transducers $T_1$–$T_n$, a selector switch 10, a noise filter 11, a high gain feedback amplifier 12 of the potentiometric type, a second noise filter 13, a transfer switch 14, a pair of additional transfer switches 15, 16, and a second high gain feedback amplifier 17 of the potentiometric type with the output appearing between an output terminal 18 and a common circuit ground 19. This circuit illustrates how the signal voltage transfer circuit of the invention may be used in a data handling system which sequentially scans data produced by the transducers for record purposes or control operations.

The transducers may be conventional in nature, such as strain gauges, potentiometers, thermocouples, varistors, and the like, each producing a signal voltage on a pair of leads. Present day data handling systems may utilize several hundred such transducers located throughout a plant and each pair of leads is preferably twisted to reduce electromagnetic pickup and electrostatically shielded to eliminate effects of fluctuating electrostatic fields. One lead of each transducer pair is connected to a contact of a first set 20 of contacts of the selector switch 10 and the other lead is connected to the corresponding contact of a second set 21. Moving contacts 22, 23 of the selector switch 10 sequentially connect the transducer pairs to the noise filter 11, which is a conventional low pass LC filter. Contact 22 is designated "high side" and contact 23 is designated "low side" of the incoming signals. This does not have reference to any voltages, but refers to the sides which have high and low series impedances respectively inside the measuring system. The leads connecting the switch to the filter are preferably twisted and shielded to reduce pickup, with the shield connected to the low side of the line at 24.

The potentiometric feedback amplifier 12 may be conventional in design and amplifies the incoming signal voltage by a constant factor determined by the ratio of output resistors 25, 26. The output from the filter 11 is coupled as the input to the amplifier 12 and the output of the latter is coupled as the input to the filter 13. This latter filter is another low pass filter and also may be conventional in design. The leads connecting the amplifier 12 to the filter 13 preferably are twisted and shielded and the shield is connected to the low side of the signal leads at 24.

The filter 11 is preferably provided with an inner electrostatic shield 31 which is connected to the low side signal lead and an outer electrostatic shield 32 which is connected to the common circuit ground. The filter 13 is also preferably provided with an inner electrostatic shield 33 which is connected to the low side signal lead and an outer electrostatic shield 34 which is connected to the common circuit ground. The primary purpose of the double shielding is to eliminate sixty cycle or line frequency noise which may be generated on the signal carrying conductors. The function of the shield is described in detail in the copending application of Taylor C. Fletcher, entitled Shielding Circuit, Serial No. 770,386, filed October 29, 1958, and assigned to the same assignee as the present application.

In the preferred form of the invention shown in the drawing, the transfer switch 14 includes two single-pole, double-throw sets of contacts 38, 39 with a voltage transfer capacitor 40 connected across the moving contacts thereof. The amplified and filtered signal voltages from the transducers appear across fixed contacts 41, 42, respectively. The capacitor 40 is maintained connected across the contacts 41, 42 long enough to be charged to virtually the full signal voltage output of the amplifier 12. The moving contacts of the sets 38, 39 are then switched to their opposite positions to connect the capacitor 40 across fixed contacts 48, 49 of an intermediate transfer buss.

Each of the switches 15 and 16 is of the single-pole, double-throw type with switch 15 connecting contact 48 to the input of the amplifier 17 and switch 16 connecting contact 49 to the junction point 50 when in a first position and connecting a resistor 51 across the amplifier input when in a second position. The resistor 51 prevents the amplifier 17 from being open-circuited when the switches 15, 16 are in the first position. The switches 14, 15 and 16 may be controlled in any conventional manner, such as by means of a voltage source 47 and switch 45 connected in series across a control solenoid 43.

With the capacitor 40 connected across the contacts 48, 49 and the switches 15 and 16 in the first position, the voltage charge on the capacitor serves as the input to the amplifier 17 which may be conventional in design and similar to the amplifier 12. The gain of the amplifier 17 is controlled by the ratio of output resistors 53, 54. The leads coupling the transfer switches to the amplifier 17 also are preferably twisted and shielded and connected to the common circuit ground at 55.

It should be noted that the input or signal generating side of the circuit comprising the transducers, the switch 10, the filters 11 and 13, and the amplifier 12 are floating with respect to ground while the output or signal responsive side comprising the amplifier 17 is tied into the common circuit ground. Thus, the desired floating input, grounded output arrangement is achieved.

An electrostatic shield 56 is provided around the capacitor 40 with the shield connected to the moving contact of the set 39. Thus the capacitor shield is switched from the floating to the grounded side and returns simultaneously with switching of the capacitor itself. The shield 56 prevents capacitive coupling between the plates of the capacitor 40 and any grounded part of the system and eliminates effects due to asymmetrical impedances associated with the floating signal lines. The stray capacitance from the low side plate to the shield is shorted by connection of the plate to the shield and the stray capacitance from the other plate to the shield is placed in parallel with the capacitor 40 by this connection, merely adding a small amount to the total capacitance of the capacitor 40. The shield 56 prevents charging of these stray capacitances and the capacitor 40 by the common mode voltages. However, the stray or incidental capacitance between the shield 56 and circuit ground is charged by the common mode voltages. Adverse effects due to this factor are avoided by connecting the shield to circuit ground through the switch 16 and resistor 54 prior to connection of the capacitor 40 to the amplifier 17. The preferred sequence of operating the switches 14, 15 and 16 is set out in detail below.

The switch 14 including the capacitor 40 and its shield 56 are enclosed within another electrostatic shield which is connected to the circuit ground. This second shield enclosing the switch may be the shield 34 which also encloses the filter 13 and the shield 33. The outer shields 32 and 34 can be either real shields or can represent the enclosure of the equipment which is grounded. It is preferred that they be real shields which serve to shield adjacent circuitry from the common mode voltages which appear on the inner shields 31 and 33.

Ordinarily the capacitor 40 and shield 56 will be mounted some distance from the transfer switch 14. In this case, shielded wires must be used, and the shield or shields of the wires connected to the shield 56. The wires will then act merely as slight extensions of the capacitor plates.

Switching of the shield with the switching of the capacitor provides minimal common mode effects on the grounded side of the system, whereas should the shield be permanently connected to one of the input lines, there would be a common mode path through the intercapacitance between the transfer capacitor and its shield even at the time the capacitor is connected to the output or grounded side of the circuit.

First consider the operation of the circuit with the switches 15 and 16 in the first position. For purposes of this description, they may be omitted, with contacts 48 and 49 directly connected to the amplifier 17 and junction point 50, respectively. In operating the transfer switch 14, it is preferred to disconnect the transfer capacitor from the floating input lead having the higher impedance to ground prior to disconnecting the capacitor from the floating input lead having the lower impedance to ground. In other words, the moving contact of the set 38 is moved from the fixed contact 41 prior to movement of the moving contact of the switch 39 from the fixed contact 42. Furthermore, it is preferred to connect the low side of the transfer capacitor to the output device prior to connecting the high side, i.e., contact should be made to contact 49 first. This allows the stray capacitance between the shield 56 and ground to discharge before contact is made to contact 48, which completes the amplifier input circuit. It is also desirable that both floating side connections be broken before contact is made to contact 49. This sequence provides for discharge of the stray capacitance and prevents coupling of common mode voltages to the output device. If the set of contacts 39 was operated first, a common mode path would exist through the set 38, the capacitor 40, and the capacitance from shield 56 to ground. This would result in charge being transferred to the capacitor 40 by common mode voltage.

The signal voltage transfer circuit of the invention may be used in locations where the common mode voltage due to electrostatic pickup is quite large and as much as a hundred times greater in amplitude than the total range of the direct current signal being measured. However, the circuit of the invention permits measurement of differences in signal voltages carried by leads that at the same time carry common mode voltages one hundred thousand times or more larger in amplitude.

While the transfer swtich 14 is shown herein as a single relay having two sets of contacts 38, 39, with the contacts adjusted to open and close in the preferred sequence, it should be realized that the invention is not restricted to this particular type of switch. For example, the switch 14 could comprise a pair of single-pole, double-throw relays operating in the desired sequence.

In particular, where a long operating life is essential, the switch 14 may be of the mercury type and the two sets of double-throw contacts 38, 39 may have make-before-break characteristics. However, the desired conductive isolation between the floating signal source and the grounded output device may be maintained by inserting the intermediate transfer buss and the switches 15 and 16 and operating the transfer circuit in the following pattern. With switches 15 and 16 in the second position, connecting the resistor 51 across the output device and leaving the intermediate buss floating, the transfer capacitor 40 is connected across the contacts 41, 42 by the transfer switch 14. When it is desired to transfer the voltage signal from the source to the output device, the transfer switch 14 is actuated to disconnect the capacitor 40 from the contacts 41, 42 and connect it across the contacts 48, 49. The fact that there may be conduction between contacts 41 and 48 and between contacts 42 and 49 during this operation does not affect the relation of the floating input to the grounded output. This is true because the contacts 48 and 49 are also floating, since switches 15 and 16 are in the second position. After the capacitor 40 has been disconnected from the contacts 41, 42 and connected to the contacts 48, 49, the switches 15 and 16 are actuated to couple the signal voltage, now appearing as a charge on the capacitor, to the amplifier 17 as an input signal, with the switch 16 being actuated first according to the preferred sequence discussed above. This switching method provides for transfer of the signal voltage from the floating input to the grounded output and also permits the use of mercury type relays which have exceeding long life.

When the transfer capacitor 40 is to be again connected to the signal source, the switches 15, 16 are first opened and then the switch 14 is actuated to remove the capacitor from the contacts 48, 49 and connect it to the contacts 41, 42.

The use of the intermediate transfer buss in conjunction with the shielded transfer capacitor and mercury type relays provides for many years of operation of a circuit for transferring a voltage from a floating source to a grounded load.

While the transfer circuit of the invention has been shown herein in conjunction with a particular arrangement of filters, amplifiers, and the like, it will be understood that the transfer circuit is not limited to this particular application and may be subjected to various changes, modifications and substitutions without necessarily departing from the spirit of the invention.

We claim as our invention:

1. In an apparatus for the transfer of a voltage signal from first and second terminals of a signal generating device to third and fourth terminals of a signal responsive device with substantial isolation between the signal generating device and the signal responsive device, the combination of: a first switch with a first fixed contact connected to said first terminal, a second fixed contact connected to said third terminal and a moving contact for engaging said fixed contacts seriatim; a second switch with a first fixed contact connected to said second terminal, a second fixed contact connected to said fourth terminal and a moving contact for engaging said fixed contacts seriatim; a capacitor connected between said moving contacts of said switches; an electrostatic shield positioned around said capacitor and connected to one of said moving contacts; and means for operating said switches asynchronously to sequentially connect said capacitor across said first and second terminals and said third and fourth terminals.

2. In an apparatus for the transfer of a voltage signal from first and second terminals of a signal generating device to third and fourth terminals of a signal responsive device with the second terminal having a lower impedance to earth ground than the first terminal, the combination of: a first switch with a first fixed contact connected to said first terminal, a second fixed contact connected to said third terminal and a moving contact for engaging said fixed contacts seriatim; a second switch with a first fixed contact connected to said second terminal, a second fixed contact connected to said fourth terminal and a moving contact for engaging said fixed contacts seriatim; a capacitor connected between said moving contacts of said switches; an electrostatic shield positioned around said capacitor and connected to the moving contact of said second switch; and means for actuating said switches in timed relationship to sequentially connect said capacitor across said first and second terminals and said third and fourth terminals, with said capacitor being removed from said first terminal before being removed from said second terminal.

3. In an apparatus for the transfer of a voltage signal from first and second terminals of a signal generating device to third and fourth terminals of a signal responsive device with the second terminal having a lower impedance to earth ground than the first terminal, the combination of: a first switch with a first fixed contact connected to said first terminal, a second fixed contact connected to said third terminal and a moving contact for engaging said fixed contacts seriatim; a second switch with a first fixed contact connected to said second terminal, a second fixed contact connected to said fourth terminal and a moving contact for engaging said fixed contacts seriatim; a capacitor connected between said moving contacts of said switches; an electrostatic shield positioned around said capacitor and connected to the moving contact of said second switch; and means for actuating said switches in timed relationship to sequentially connect said capacitor across said first and second terminals and said third and fourth terminals, with said capacitor being removed from said first terminal before being removed from said second terminal and with said capacitor being connected to said fourth terminal before being connected to said third terminal.

4. In an apparatus for the transfer of a voltage difference existing between two terminals of an output generating device to an input responsive device having two terminals, with none of the terminals of the output generating device common to either terminal of the input responsive device, the combination of: a capacitor having a first terminal and a second terminal; first switching means for alternately connecting one terminal of said capacitor to one terminal of said output generating device and one terminal of said input responsive device; second switching means operating asynchronously with respect to said first switching means for connecting the other terminal of said capacitor alternately to the other terminal of said output generating device and the other terminal of said input responsive device; a first electrostatic shield around said capacitor and connected to one terminal thereof; and a second electrostatic shield around said first shield and said first and second switching means and connected to a common circuit ground with said input responsive device.

5. In an apparatus for the transfer of a voltage difference existing between two terminals of an output generating device to an input responsive device having two terminals, with none of the terminals of the output generating device common to either terminal of the input responsive device, the combination of: a capacitor having a first terminal and a second terminal; a filter section having two input terminals for connecting to the terminals of said output generating device respectively and having two output terminals; first switching means for alternately connecting one terminal of said capacitor to one output terminal of said filter section and one terminal of said input responsive device; second switching means operated asynchronously with respect to said first switching means for connecting the other terminal of said capacitor alternately to the other output terminal of said filter section and the other terminal of said input responsive device; a first electrostatic shield around said capacitor and connected to one terminal thereof; a second electrostatic shield around said filter section and connected to one terminal of the output generating device; and a third electrostatic shield around said first and second shields and said first and second switching means and connected to a common circuit ground with said input responsive device.

6. In an apparatus for transferring analog voltage signals from a floating signal source to a grounded output device by means of a voltage transfer capacitor and a double-pole, double-throw mercury type transfer switch, having make-before-break characteristics, which transfer switch connects the capacitor alternately across two output terminals of the source and two transfer terminals, the combination of: a first circuit for connecting one of said transfer terminals to said output device, said first circuit including a first switch having an open and a closed position; a second circuit for connecting the other of said transfer terminals to said output device, said second circuit including a second switch having an open and a closed position, with said first and second switches in said open position when said transfer switch is connecting said capacitor across said output terminals of said source; and means for actuating said transfer, first and second switches in timed relationship to move said first and second switches to said closed positions after said transfer switch connects said capacitor across said transfer terminals.

7. In an apparatus for transferring analog voltage signals from a floating signal source to a grounded output device by means of a voltage transfer capacitor and a double-pole, double-throw transfer switch, which transfer switch connects the capacitor alternately across low and high output terminals of the source and corresponding low and high transfer terminals, with the low output terminal having a lower impedance to ground than the high output terminal, the combination of: a first circuit for connecting said low transfer terminal to said output device, said first circuit including a first switch having an open and a closed position; a second circuit for connecting said high transfer terminal to said output device, said second circuit including a second switch having an open and a closed position, with said first and second switches always in said open positions when said transfer switch is connecting said capacitor across said output terminals of said source; and means for actuating said transfer, first and second switches in timed relationship to move said first and then said second switch to said closed positions after said transfer switch connects said capacitor across said transfer terminals and to move said first and then said second switch to said open positions before said transfer switch disconnects said capacitor from said transfer terminals.

8. A voltage switching network, including: first and second input terminals, with said second input terminal having a lower impedance to ground than said first input terminal; first and second intermediate terminals; first and second output terminals; a voltage transfer capacitor; an electrostatic shield around said capacitor and connected to one terminal thereof; a double-pole, double-throw switch of the make-before-break type for alternately connecting said capacitor across said input and said intermeditae terminals, with said one terminal of said capacitor being connected to said second input and intermediate terminals; a first single-pole, single-throw switch connected between said first intermediate and said first output terminals; a second single-pole, single-throw switch connected between said second intermediate and said second output terminals; and means for actuating said switches in sequence to connect said capacitor across said intermediate terminals, then close said second single-pole, single-throw switch and then close said first single-pole, single-throw switch.

9. A voltage switching network, including: first and second input terminals, with said second input terminal having a lower impedance to ground than said first input terminal; first and second intermediate terminals; first and second output terminals; a voltage transfer capacitor; an electrostatic shield around said capacitor and connected to one terminal thereof; a double-pole, double-throw switch of the make-before-break type for alternately connecting said capacitor across said input and said intermediate terminals, with said one terminal of said capacitor being connected to said second input and intermediate terminals; an output shunting impedance; a first single-pole, double-throw switch for connecting said first output terminal to said first intermediate terminal and to one end of said impedance seriatim; a second single-pole, double-throw switch for connecting said second output terminal to said second intermediate terminal and to the other end of said impedance seriatim; and means for actuating said switches in sequence to connect said capacitor across said input terminals and said impedance across said output terminals, then connect said capacitor across said intermediate terminals, then connect said second intermediate terminal to said second output terminal, and then connect said first intermediate terminal to said first output terminal.

References Cited in the file of this patent

UNITED STATES PATENTS

| | | |
|---|---|---|
| 2,137,278 | George et al. | Nov. 22, 1938 |
| 2,199,447 | Ruben | May 7, 1940 |
| 2,205,816 | Hartzell | June 25, 1940 |
| 2,534,043 | MacPhail | Dec. 12, 1950 |
| 2,724,022 | Williams et al. | Nov. 15, 1955 |
| 2,750,547 | Wannamaker et al. | June 12, 1956 |
| 2,835,874 | First et al. | May 20, 1958 |
| 2,843,839 | Cunningham et al. | July 15, 1958 |
| 2,889,470 | Gray et al. | June 2, 1959 |
| 2,907,902 | McIntosh et al. | Oct. 6, 1959 |
| 2,937,369 | Newbold et al. | May 17, 1960 |

FOREIGN PATENTS

| | | |
|---|---|---|
| 934,652 | France | Jan. 19, 1948 |